(12) United States Patent
Mayer et al.

(10) Patent No.: US 8,282,087 B2
(45) Date of Patent: Oct. 9, 2012

(54) OSCILLATION DECOUPLING DEVICE

(75) Inventors: Dirk Mayer, Darmstadt (DE); Tobias Melz, Darmstadt (DE); Martin Thomaier, Darmstadt (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 838 days.

(21) Appl. No.: 11/914,818

(22) PCT Filed: May 12, 2006

(86) PCT No.: PCT/EP2006/004502
§ 371 (c)(1),
(2), (4) Date: Jul. 10, 2008

(87) PCT Pub. No.: WO2006/122726
PCT Pub. Date: Nov. 23, 2006

(65) Prior Publication Data
US 2009/0206532 A1    Aug. 20, 2009

(30) Foreign Application Priority Data

May 19, 2005 (DE) .......................... 10 2005 023 074
Sep. 13, 2005 (DE) .......................... 10 2005 043 429

(51) Int. Cl.
*F16F 5/00* (2006.01)
(52) U.S. Cl. ........... 267/140.14; 267/140.15; 188/266.7; 248/562
(58) Field of Classification Search ............. 267/140.14, 267/140.15, 140.11, 136; 188/266.7, 378–380; 248/562, 636, 638, 550, 551
See application file for complete search history.

(56) References Cited

U.S. PATENT DOCUMENTS

| | | | |
|---|---|---|---|
| 4,981,309 A * | 1/1991 | Froeschle et al. | 280/6.157 |
| 5,645,260 A | 7/1997 | Falangas | |
| 5,906,254 A * | 5/1999 | Schmidt et al. | 188/378 |
| 6,354,576 B1 | 3/2002 | Jacobs et al. | |
| 6,378,672 B1 * | 4/2002 | Wakui | 188/378 |
| 6,508,127 B1 * | 1/2003 | Namerikawa et al. | 73/514.34 |
| 6,967,561 B2 * | 11/2005 | Bower et al. | 338/47 |
| 7,143,641 B2 * | 12/2006 | Palazzolo et al. | 73/114.48 |
| 7,246,807 B2 * | 7/2007 | Katagiri et al. | 280/124.144 |

FOREIGN PATENT DOCUMENTS

| | | |
|---|---|---|
| DE | 103 26 625 A1 | 2/2005 |
| DE | 103 61 481 A1 | 2/2005 |
| EP | 0 470 064 B1 | 12/1994 |
| JP | 63-203941 | 8/1988 |

* cited by examiner

*Primary Examiner* — Robert A Siconolfi
*Assistant Examiner* — Mariano Sy
(74) *Attorney, Agent, or Firm* — Antonelli, Terry, Stout & Kraus, LLP.

(57) ABSTRACT

An oscillation decoupling device is disclosed with a load-receiving element which is mounted in an oscillating manner relative to a support unit at least along an active direction along which at least part of the load is applied having at least one sensor unit which detects an oscillation of the element due to the load and at least one actuator unit acting against the oscillation of the element. The support unit is modularly configured and serves as a support structure for at least one unit that receives the element and is elastically deformable in the active direction of the load. The load-receiving element is connected to the elastically deformable unit. The at least one actuator influences the deformation applied to the at least one unit, or is integrated thereon, so that the at least one actuator initiates a deformation acting against an elastic deformation due to the load inside the unit.

16 Claims, 3 Drawing Sheets

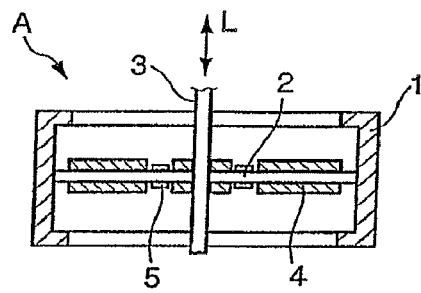
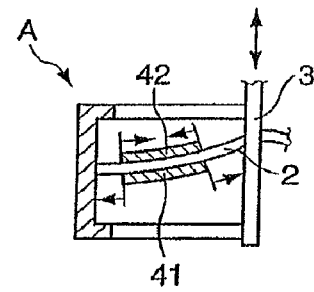
Fig. 1a    Fig. 1b
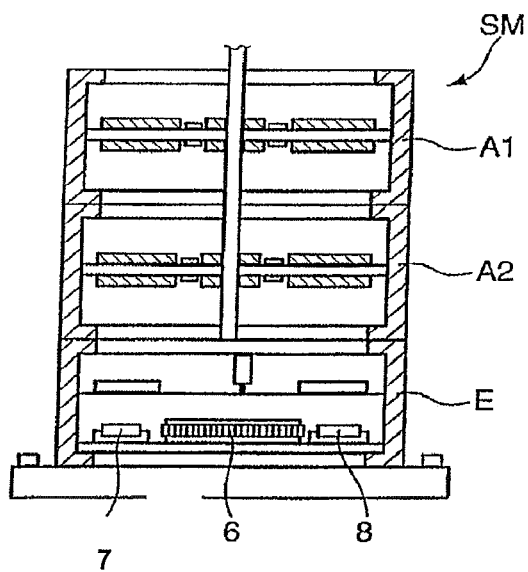
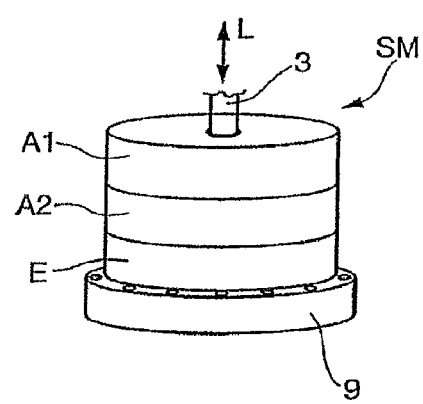
Fig. 2    Fig. 3

OSCILLATION DECOUPLING DEVICE

BACKGROUND OF THE INVENTION

1. Field of the Invention

The invention relates to an oscillation decoupling device with a load-receiving element which is mounted in an oscillating manner relative to a support unit at least along an active direction along which the at least one part of the load is applied, and with at least one sensor-actuator unit which detects an oscillation of the element due to the load and acts against the oscillation of the element by means of actuators.

2. Description of the Prior Art

In almost all fields of the art, oscillation problems arise which must be solved, for example, by decoupling a partial structure from its vibrating environment. Typical examples of this are mountings of measurement sensitive measuring apparatus in laboratories for decoupling impact noise and other disturbances by means of suitably designed damping systems, but similar problems also arise in aviation and space systems. On the other hand, it is necessary to decouple sources of disturbing vibrations from a structure surrounding them, as frequently encountered, for example, in the mountings of drive units in vehicles, aircraft or ships.

For this purpose differently designed oscillation decoupling devices are known which exert a purely passive damping of oscillating action with the use of elastic or damping materials. However, the disadvantage of these devices lie in the fact that it is not possible to adapt to changing system characteristics in order to maintain as optimum an oscillation damping as possible. Moreover, although the use of the softest possible mountings results in effective oscillation damping or oscillation decoupling, this is also associated with imprecise mounting of the decoupled system. On the other hand, although stiffer mounting systems allow more precise system positioning, the quality of the oscillation decoupling suffers correspondingly, particularly in the case of oscillations with small amplitudes and high frequencies.

In addition to purely passively designed oscillation decoupling systems, mechatronic and adaptronic solutions are being used to an increasing extent. The oscillation decoupling is achieved by means of actively introduced compensation signals which serve for the controlled activation of electrodynamic actuators, magnetic bearings or piezo-actuators which are integrated in the region of oscillation decoupled interfaces and make an active contribution to oscillation decoupling, in the sense of an oscillation reduction, for the specific coupling of counter-oscillations.

Reference is made, by way of example, to U.S. Pat. No. 5,645,260, which describes an oscillation decoupling device which is provided between a load and a vibrating background. The load rests essentially on an elastic support structure in the form of a jib angle along whose jib elements, orientated perpendicularly to each other, are installed flat piezo-actuators which are capable of inducing both horizontally and vertically directed oscillations into the jib angle due to their arrangement orientated orthogonally to each other, with the ultimate object being effective oscillation decoupling. The prior art arrangement of the piezo-actuators also has the advantage that the actuators are largely protected from damaging mechanical loads by the support structure.

A further modular interface for damping mechanical oscillations is disclosed in DE 103 61 481 A1, which provides for a plurality of energy converter systems kinematically coupled to each other between a basic connecting element and a load connecting element. These systems, in a similar manner to the oscillation decoupling system explained above, are based on the specific control of piezoelectric converter materials. However, the energy converter systems, designed as piezoelectric stacking actuators, are operated under mechanical pretension and are protected against loading by shearing and torsion. Therefore, there is a need for comprehensive mechanical protective measures for the actuators.

The oscillation decoupling devices of the prior art predominantly represent systems that are individually adapted to certain interfaces between two components to be oscillation decoupled. These systems cannot be used in other systems to be decoupled or can only be used in them with expensive design modifications. Moreover, the integration of the piezo-actuators in the structure concerned represents a high construction expenditure which is unavoidably associated with high production and assembly costs.

SUMMARY OF THE INVENTION

The invention is an oscillation decoupling device with a load-receiving element which is mounted in an oscillating manner relative to a support unit at least along an active direction along which at least part of the load is applied. At least one sensor-actuator unit detects an element that is oscillating due to the load and acts against the oscillation of the element by means of actuators, so that the device can be used universally and represents no special solution to an individual oscillation problem. The device should, on the one hand, have the advantages of an elastically passive mounting with actuating components, and should, at the same time, provide the possibility of integrating all the components in one structural unit for independent operation. This should provide a system that is easy to handle, is robust and can be used under difficult environmental conditions.

According to the invention, an oscillation decoupling device is represented with a load-receiving element which is mounted in an oscillating manner relative to a support unit at least along an active direction along which at least part of the load is applied, and with at least one sensor-actuator unit which detects an element oscillating due to the load and acts against the oscillation of the element by means of actuators. The support unit is modularly configured and serves as a support structure for at least one unit that receives the element and is elastically deformable at least in the active direction of the load. At least one actuator influencing the deformation is applied to the at least one unit, or is integrated in the unit, so that the actuator initiates a deformation acting against the elastic deformation due to the load inside the unit.

The invention is based on a modular concept and the associated simple, versatile applicability of the invention. The support unit serving as the support structure for the elastic unit is designed as a fixed module housing which accommodates the elastically deformable unit provided for oscillation absorption. The actuators are attached to or provided on the support unit for the specific introduction of counter-oscillations. The unit and actuators are protected from disturbing external oscillation influences. The stiffness of the elastically deformable unit must be chosen according to the size and intensity of a static and/or dynamic external load to be decoupled. The deformable unit, in a preferred embodiment, is a membrane which spans an internal free cross-sectional area of the module housing so that is freely supported, and is connected on the inside, in at least two regions, preferably throughout its circumferential edge, to the module housing. The elasticity and stiffness or stroke of the flat designed, elastically deformable unit can therefore be correspondingly adapted based on the choice of material, shape and thickness. The elastically deformable unit therefore represents the elastic, passive part of the oscillation decoupling system, and is connected indirectly or directly to an element which is preferably a rod and is orientated perpendicularly to the extension of the elastically deformable unit along which the external load to be decoupled acts, which ultimately results in a deflection or deformation of the elastically deformable element perpendicularly to the extension of the element.

A further possibility of adjusting the stiffness behavior of the elastic, passive part of the oscillation decoupling system is providing two or more elastically deformable units inside a module housing which can be mechanically connected in parallel or in series. In the former case, a coupling of the at least two elastically deformable units to a rod must be provided, while in the latter case coupling is not provided, and the elastically deformable units are therefore able to absorb a proportion of the external static and/or dynamic loads.

A mechanically serial and/or parallel connection of two or more modules is also possible. In this case the parallel connection of modules serves to increase the oscillation travel. In this case, the rod elements of the modules are not connected to each other, while the serial connection serves to increase stiffness and to transmit higher forces. In a preferred embodiment, the rod elements of the modules are connected to each other.

Moreover, combinations of modules connected mechanically in parallel and in series are conceivable. For a clearer representation of the invention, it is assumed in the following that only one single elastically deformable unit designed in the form of a membrane is provided inside the previously described module housing.

For an effective reduction of the oscillations induced by an externally applied dynamic load inside the elastically deformable unit in the form of a membrane, the membrane is connected to at least one and preferably a plurality of flat electromechanical converters or actuators which, when suitably controlled, give rise to controlled deformation of the elastically deformed unit in the form of a membrane. Piezoelectric plate actuators, which are applied to and/or integrated in the surface of the elastically deformable unit in the manner of a membrane, and which expand or contract due to the application of an electric voltage. As a result, the actuators introduce a bending moment into the elastically deformable unit to produce a bend perpendicular to the extension of the unit, are particularly suitable as electromechanical converters. This enables actuators to intervene in the oscillation behavior of the elastically deformable unit in a specifically controlled and regulated manner in or against the active direction of the external load.

In a preferred embodiment, at least one sensor detecting the deformation of the unit is applied to the elastically deformable unit, or is integrated in the unit, for detecting the current oscillation state of the elastically deformable unit. In a similar manner to the actuator principle explained above, an electromechanical converter, for example, a piezoelectric plate sensor, which generates a voltage signal that can be evaluated by measurement of a deformation, is also suitable as the sensor. The signal is used for controlling or regulating the actuators connected to the elastically deformable unit and operating the electronic unit E of FIG. 3 with a part of the electrical energy generated by the sensor.

Alternatively to or in combination with sensors connected directly to the elastically deformable unit, it is also possible to install corresponding sensors, for example in the form of acceleration sensors, in the region of the load or the body to be decoupled. For example, a sensor directly on the oscillating body may be connected to the element or in the load path of the load along the element which is connected to the elastically deformable membrane. Independent of the different designs and installation of the sensors, it is necessary to detect the oscillation behavior of the at least one elastically deformable unit integrated inside the module housing in order to generate control or regulating signals for activating the at least one actuator connected to the elastically deformable unit. The object is reducing the externally applied oscillations along the elastically deformable unit designed in the form of a membrane.

The processing of the signals generated by the sensors, and the generation of corresponding control signals for the actuators, are preferably carried out with suitable control logic which is preferably based on digital signal processing and, for reasons of cost, can be implemented on low-cost embedded platforms such as DSP, microcontrollers and FPGA.

In principle, it is possible to install any electrical components required both for energy supply and signal evaluation together with the components explained above inside the module housing. In order to obtain and optimize the modularity of the inventive device, it is advantageous to provide a modularly configured electronic unit that can be integrated in the module housing or can be applied to the existing module housing for energy supply and/or signal control and/or signal evaluation of the at least one sensor and actuator. It is appropriate to design the electronic unit required for the energy supply and signal control of the individual actuator modules combined together as a separate electronic module which is particularly for the purpose of combining two or more module housings which have at least one elastically deformable unit with corresponding sensors and actuators connected by a common element for receiving an external static and/or dynamic loads. The electronic module has its own module housing and can be combined as an entire system by a suitable mechanical, as well as electrical connection system via at least one of the combined actuator modules.

Of particular interest is the design of the invention's oscillation decoupling device in the form of a completely autonomously and largely independently operating unit. That is, all the components required for effective oscillation decoupling, including the energy supply, are joined together in the form of individual modules in one entire system which can be inserted as an interface between an oscillating body and a corresponding base surface.

In the case of an adaptively configured actuator control for specific deflection of the membrane of the elastically deformable unit inside an actuator module, it is possible to supply the reference signals required for controlling the actuators connected to the elastically deformable unit from outside such as, for example, wirelessly using an intrinsically known telemetry technique. It is therefore possible, for example, to suppress disturbing vibrations of a rotary machine by externally gained speed-synchronous trigger signals, which are supplied telemetrically as reference signals to the actuators inside the actuator modules. In this case, no further sensors are required for detecting the current oscillating state of the elastically deformable unit, particularly as the actuators are controlled by externally predetermined trigger signals which are frequently available via existing bus systems. If such external trigger signals are not available, there is also the possibility of estimating the interference signal by one or a plurality of acceleration sensors applied to the interference source, as a result of which suitable reference signals can also be generated.

The use of digital signal processing for control implementation, particularly when a plurality of devices configured modularly according to the invention is used, for example, on a vibrating machine for support at different points for oscillation decoupling, to provide the interesting possibility of exchanging data with an externally provided central computer. For this purpose each individual oscillation decoupling module has one actuator and one electronic module and includes a telemetry unit for wireless data transmission. Obviously it is also possible in most cases associated with technical and design difficulties, for data to be exchanged with a central computer on a wired basis. The reference signals controlling the individual oscillation modules can be optimized by the central collection and evaluation of all the information on an oscillating system. It is also possible to carry out self-diagnoses in each individual oscillation decoupling module on the basis of digital signal processing, which diagnoses serve to optimize control parameters for controlling the individual actuator modules by feedback to the central computer.

BRIEF DESCRIPTION OF THE DRAWINGS

The invention is described by way of example below, without limiting the general inventive concept, by means of exemplary embodiments with reference to the drawings, in which:

FIGS. 1a and b show a schematized longitudinal section and partial longitudinal section, respectively, through an actuator module;

FIG. 2 shows a schematized longitudinal section representation through a modularly configured oscillation decoupling device;

FIG. 3 shows a schematized perspective representation of the module shown in FIG. 2;

DETAILED DESCRIPTION OF THE INVENTION

Figure 4:
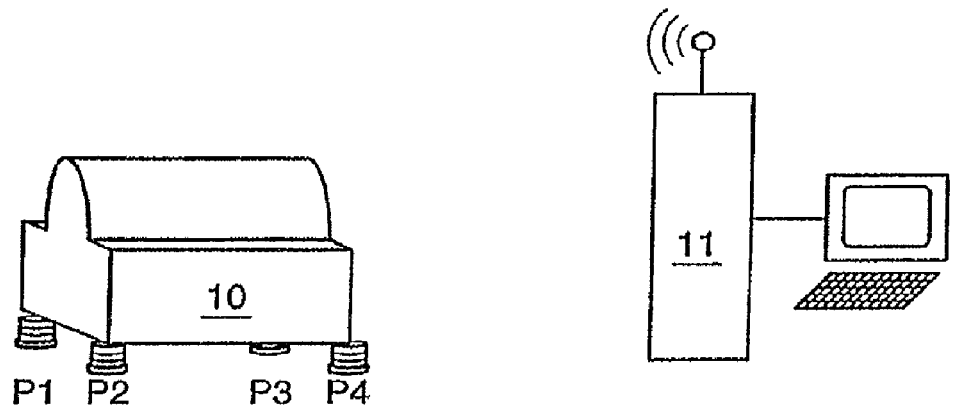
FIG. 4 shows a module arrangement for the oscillation decoupling of an oscillating unit.

FIG. 1a shows a schematized longitudinal section representation through an actuator module which is enclosed by a hollow cylindrical module housing 1. Module housing 1 serves as a supporting structure for an electrically deformable unit 2 form having a membrane and installed inside module housing 1. The deformable unit 2, is a flat element similar to a leaf spring, which at least partially spans the internal free housing cross-section which is fixedly connected to its peripheral circumferential edge to the inner wall of module housing 1. An element 3, shaped as a rod, is installed centrally to the flat or membrane-like configured elastically deformable unit 2. The longitudinal rod 3 is orientated essentially perpendicularly to the plane of the flat unit 2 to which an external load L is applied to actuator module A, and, in particular, to the elastically deformable unit provided in actuator module A.

Element 3 may be connected fixedly or releasably to elastically deformable unit 2, for example by way of a screw connection. Elastically deformable unit 2 is deformed perpendicularly to its superficial extension caused by the predesigned introduction of a force from an external static or dynamic load L via element 3. In order to counteract these externally induced deformations to which elastically deformable unit 2 is exposed, in an oscillating damping manner, flat, energy converting actuators 4 are installed on the surfaces of the membrane of elastically deformable unit 2. The actuators are preferably produced from piezoceramic, lead-free piezoceramic, an electrostrictive ceramic, PVDF (polyvinylidene fluoride), magnetostrictive alloys, bi-metals or from a shaped memory alloy or shaped memory polymer, all of which are converter materials which are capable of changing their spatial shape in terms of their length by means of an external electrical voltage supply.

FIG. 1b shows a schematized partial longitudinal section through an actuator module A shown in FIG. 1a, with two flat designed piezo-actuators 41 and 42 installed on the upper and lower side of elastically deformable unit 2. These actuators are controlled so that piezo-actuator 42 installed on the upper side of the membrane of the elastically deformable unit 2 is shortened, whereas the piezo-actuator 41 provided on the lower side is expanded. As a result of this, elastically deformable unit 2 experiences an upward directed curvature in the representation according to FIG. 1b, causing element 3 to be deflected upwards.

The principle of the oscillation decoupling provides for the actuator deflection of elastically deformable unit 2, in exactly the opposite phase to the load L applied externally via element 3.

Furthermore, a plurality of sensors 5 are installed on and/or integrated in the upper and lower side of the membrane of elastically deformable unit 2. The sensors 5 may also exist as the actuators produced from a converter material. Obviously it is possible to design the sensors as DMS's or the like, in order to detect the current deformation state and associated with the current oscillation state of elastically deformable unit 2, and to generate corresponding sensor signals.

FIG. 2 shows a schematized longitudinal section representation of an oscillation decoupling module SM, having two actuator modules A1 and A2 connected mechanically in series and an electronic module E connected to actuator module A2. Actuator modules A1 and A2 are designed according to FIGS. 1a and b, and each have an elastically deformable unit 2, all of them connected to a single element 3 by which the external load is applied to oscillation decoupling module SM. For the energy supply, but in particular also for data evaluation and controlled signal supply to actuators 2, an electronic module E is provided which, for reasons of compact design, is formed in the same or a similar manner in terms of housing design as actuator modules A1 and A2. All modules A1, A2 and E have mechanical interfaces which facilitate the coupling together of the module units. The electronic module comprises a power conditioning unit 6, which supplies the energy for controlling the actuators, for example in the case of piezo-actuators in the form of a voltage amplifier and components of signal data evaluation units 7 and 8, in which sensor data are supplied and evaluated in order finally to generate control signals for activating the actuators. Provision is preferably made for the electrical connection between the electronic components contained inside actuator modules A1 and A2 and those in electronic module E by suitably designed connection contact points (not shown), in order to conform to the modularity principle. Depending on the loads applied, oscillation decoupling module SM provides the possibility of increasing the stiffness of the passively elastic parts, that is the elastically deformable units, by adding further actuator modules.

FIG. 3 shows, in schematized form, an oscillation decoupling module SM composed of two actuator modules A1 and A2 and an electronic module E, from whose upper housing end projects element 3, by means of which external load L is introduced and supported for the purposes of oscillation decoupling. Oscillation decoupling module SM is fastened to a stable base 9 so that precise positioning is ensured. On the other hand, the module could also be installed on an elastic structure, but this depends on the particular application.

The exemplary embodiment shown in FIG. 4 provides for the oscillation decoupling of an oscillating unit 10, which is mounted at four support points P1, P2, P3 and P4 on suitably designed oscillation decoupling modules SM. In this design variant, the individual oscillation decoupling modules SM have telemetry units by which the reference signals are sent from central computer 11 for controlling the actuators contained in oscillation decoupling modules SM. Similarly all data deleted from sensors can be evaluated centrally by such wireless data communications technology on the oscillating state of unit 10 to guarantee optimized control of the corresponding actuator modules inside oscillation decoupling modules SM.

Figure 5A:
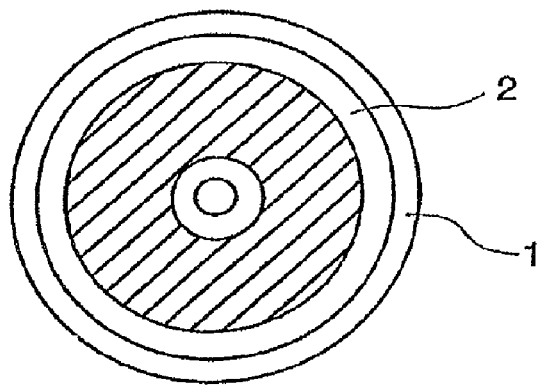
FIGS. 5a-c show a schematized cross-sectional representation through an actuator module with an elastically deformable unit.
Figure 5B:
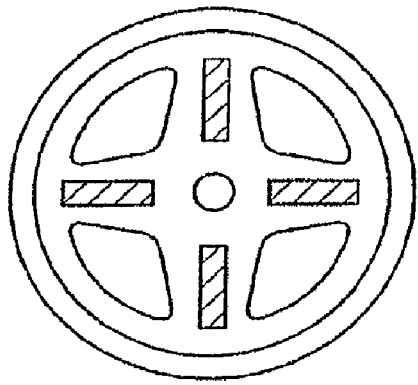
Figure 5C:
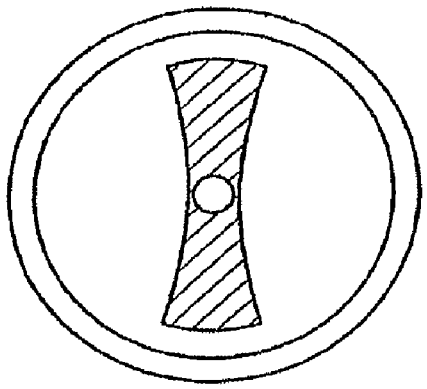

A section through an actuator module in the plane of the membrane of elastically deformed unit 2 is shown in the cross-section diagrams in FIGS. 5a to c. In all cases, module housing 1 is shaped as a hollow cylinder and has a membrane of elastically deformable unit 2 connected to module housing 1 along its entire circumferential edge. In FIG. 5a an annular actuator element 4 is provided on the surface of elastically deformable unit 2, which element represents an internal superficial connection to unit 2. In the exemplary embodiment shown in FIG. 5b, the membrane of elastically deformable unit 2 has four recesses 12, and is also connected on its surface to four strip-shaped configured actuators 4. FIG. 5c also shows an actuator, in the form represented, which is connected as a strip to elastically deformable unit 2. All the exemplary embodiments shown in FIG. 5 serve specifically to deform the membrane of elastically deformable unit perpendicularly to its plane, that is perpendicular to the drawing plane, in order to achieve an effect that reduces the oscillating load, for example by introducing oscillations that are opposite in phase to the external load.

Figure 6:
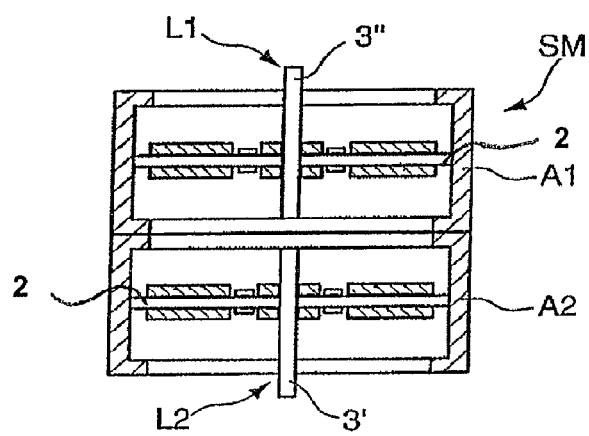
FIG. 6 shows the mechanical series connection of two actuator modules.
Figure 7:
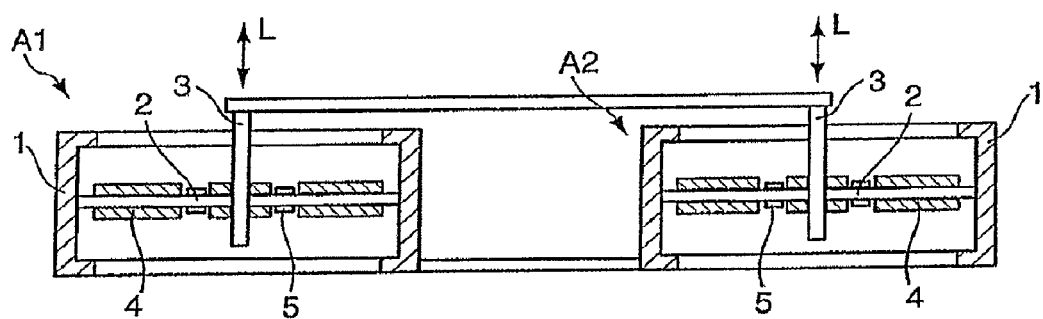
FIG. 7 shows the mechanical parallel connection of two actuator modules.

FIG. 6 shows, similarly to FIG. 2, a mechanical serial connection of Module A1 and A2, where, in contrast to the exemplary embodiment shown in FIG. 2, a rod-like configured element 2 is constructed separately. Force L2 can be applied by element 3' to elastically deformable unit 2 of lower actuator module A2, independently of force L1, which is applied by element 3" to the elastically deformable unit of upper actuator module A1. In the case of such a serial arrangement and mode of operation of at least two actuators, the actuator path can be doubled under sufficiently low active loads or low stiffnesses, whereas in the coupled case, according to the embodiment shown in FIG. 2, a doubling of the stiffness is achieved. An alternative to the embodiment in FIG. 2 is shown in FIG. 7, which represents a further type of mechanical parallel connection of a plurality of actuator modules. In this case, the two actuator modules A1 and A2 are connected to each other by means of a common base plate G. Similarly, elements 3 of actuator modules A1 and A2 are connected to each other by a yoke J, so that they are simultaneously deflected by means of a common load L.

The oscillation decoupling module explained above therefore has the following advantages:

The system can be fully integrated and affords major advantages in terms of mountability and robustness;

The combination of a membrane of the elastically deformable unit having a defined stiffness with the application and/or integration of flat designed actuators allows particularly compact design of an active-passive oscillation decoupling system;

Because of the additional application and/or integration of flat sensors on the membrane of the elastically deformable unit, the robustness and compactness of such an oscillation decoupling module can be improved.

The specific use of digital signal processing opens up the possibility of providing adaptive digital controls to ensure optimum oscillation decoupling despite variations in the interference signals or in the system characteristics.

Furthermore, it is possible, on the basis of digital signal processing, to provide communication with an external computer in order to allow the exchange of diagnostic data. This improves the possibility of maintaining such a system, particularly as the regions in which the oscillation decoupling modules are arranged in most cases to be difficult to access and cannot easily be removed for servicing purposes.

LIST OF REFERENCE NUMBERS

1 Module housing
2 Elastically deformable unit
3 Element
4 Actuator
5 Sensor
6 Energy unit
7 and 8 Components of a signal data evaluation unit
9 Base
10 Oscillating unit
11 Central computer
12 Recess

The invention claimed is:

1. An oscillation decoupling device with at least one load-receiving element connected to at least one elastically deformable unit in an active direction of a load which is mounted to oscillate relative to a support unit at least along the active direction along which at least part of the load is applied, and at least one sensor for detecting the oscillation of the element due to the load and at least one actuator for opposing an oscillation of the at least one load-receiving element, wherein the least one actuator is coupled to the at least one elastically deformable unit, so that the at least one actuator initiates a deformation inside the at least one elastically deformable unit acting against an elastic deformation caused by the load comprising:

a modular housing enclosing the at least one elastically deformable unit wherein the modular housing, the at least one elastically deformable unit and the at least one load-receiving element comprises an actuator module including a mechanical coupling to at least one other actuator module for combining at least two actuator modules stacked together to be in series, wherein elastically deformable units of at least two actuator modules are connected together to actively interact with each other to oppose the oscillation and either a) load-receiving elements of a plurality of actuator modules are connected to each other, or a single load-receiving element is provided with the at least one elastically deformable unit of each actuator module mechanically connected in parallel to each other; or b) each load-receiving element of a plurality of actuator modules are connected separately to the at least one elastically deformable unit of each actuator module so that the elastically deformable units of a plurality of actuator modules are deflectable in series;

a modular electronic unit for providing at least one of an energy supply, signal control or evaluation of the at least one sensor and at least one actuator, which is enclosed by an electronic module housing including at least one connection by which the electronic module housing is mechanically stacked to be in series with at least one of the combined actuator modules; and at least one electrical connection for contacting the at least one sensor and the at least one actuator to the modular electronic unit.

2. The device according to claim 1, comprising:

the at least one sensor detecting the deformation of the elastically deformable unit is coupled to the at least one elastically deformable unit or is integrated into the at least one elastically deformable unit.

3. The device according to claim 1, comprising:

the at least one sensor detects at least one of a deformation or an acceleration provided in a region of the load and/or in a load path of the load along the at least one load-receiving element.

4. The device according to claim 1, wherein:
the at least one load-receiving element connected to the elastically deformable unit projects from the modular housing on at least one side.

5. The device according to claim 1, wherein:
the at least one elastically deformable unit comprises a membrane spanning a cross-sectional area of the support unit and is connected to the support unit around an circumferential edge of the at least one elastically deformable unit.

6. The device according to claim 5, wherein:
the at least one actuator is coupled to a surface of the at least one elastically deformable unit or is integrated therein.

7. The device according to claim 1, wherein:
the at least one load-receiving element comprises a longitudinal rod extending orthogonally relative to the membrane.

8. The device according to claim 7, wherein:
the at least one load-receiving element is disposed centrally relative to the at least one elastically deformable unit and is connected thereto.

9. The device according to claim 1, wherein:
the at least one sensor and the at least one actuator includes a material selected from one of the following material classes: piezoceramic, lead-free piezoceramic, electrostrictive ceramic, shape memory alloy, shape memory polymer, PVDF (polyvinylidene fluoride), magnetostrictive alloy or bi-metals.

10. The device according to claim 9, wherein:
mechanical energy is converted to electrical energy by the elastic deformation of the material with at least one part of the electrical energy being usable to operate at least a part of the electronic unit.

11. The device according to claim 1, wherein:
the at least one actuator lengthens longitudinally or shortens longitudinally in response to a controlled energy supply with the lengthening or the shortening being influenced by contact with the at least one elastically deformable unit caused by a deformation of the at least one elastically deformable unit directed against the active direction of the load.

12. The device according to claim 1, comprising:
power electronics disposed inside the electronic unit.

13. The device according to claim 1, wherein:
the electronic unit utilizes digital or analog signal processing.

14. The device according to claim 1, wherein:
the electronic unit includes a telemetry unit providing a wireless data exchange to control an evaluation unit separated from the device.

15. An oscillation decoupling device with at least one load-receiving element connected to at least one elastically deformable unit in an active direction of a load which is mounted to oscillate relative to a support unit at least along the active direction along which at least part of the load is applied, and at least one sensor for detecting the oscillation of the element due to the load and at least one actuator for opposing an oscillation of the at least one load-receiving element, wherein the at least one actuator is coupled to the at least one elastically deformable unit, so that the at least one actuator initiates a deformation inside the at least one elastically deformable unit acting against an elastic deformation caused by the load comprising:

a modular housing enclosing the at least one elastically deformable unit wherein the modular housing, the at least one elastically deformable unit and the at least one load-receiving element comprises an actuator module including a mechanical coupling to at least one other actuator module for combining at least two actuator modules stacked together to be in series wherein elastically deformable units of at least two actuator modules are connected together to actively interact with each other to oppose the oscillation and load-receiving elements of a plurality of actuator modules are connected to each other, or a single load-receiving element is provided with the elastically deformable unit being mechanically connected in parallel to each other;

a modular electronic unit for providing at least one of an energy supply, signal control or evaluation of the at least one sensor and at least one actuator, which is enclosed by an electronic module housing including at least one connection by which the electronic module housing is mechanically stacked to be in series with at least one of the combined actuator modules; and at least one electrical connection for contacting the at least one sensor and the at least one actuator to the module electronic unit.

16. An oscillation decoupling device with at least one load-receiving element connected to at least one elastically deformable unit in an active direction of a load which is mounted to oscillate relative to a support unit at least along the active direction along which at least part of the load is applied, and at least one sensor for detecting the oscillation of the element due to the load and at least one actuator for opposing an oscillation of the at least one load-receiving element, wherein the at least one actuator is coupled to the at least one elastically deformable unit, so that the at least one actuator initiates a deformation inside the at least one elastically deformable unit acting against an elastic deformation caused by the load comprising:

a modular housing enclosing the at least one elastically deformable unit wherein the modular housing, the at least one elastically deformable unit and the at least one load-receiving element comprises an actuator module including a mechanical coupling to at least one other actuator module for combining at least two actuator modules stacked together to be in series, wherein elastically deformable units of at least two actuator modules are connected together to actively interact with each other to oppose the oscillation and each load-receiving element of a plurality of actuator modules are connected separately to the at least one elastically deformable unit of each actuator module so that the elastically deformable units of a plurality of actuator modules are deflectable in series;

a modular electronic unit for providing at least one of an energy supply, signal control or evaluation of the at least one sensor and at least one actuator, which is enclosed by an electronic module housing including at least one connection by which the electronic module housing is mechanically stacked to be in series with at least one of the combined actuator modules; and at least one electrical connection for contacting the at least one sensor and the at least one actuator to the module electronic unit.

* * * * *